(12) United States Patent
Robinette et al.

(10) Patent No.: US 8,256,562 B2
(45) Date of Patent: Sep. 4, 2012

(54) POWERTRAIN HAVING MULTI-STAGE DAMPER

(75) Inventors: Darrell Lee Robinette, Fenton, MI (US); Randall S. Beikmann, Brighton, MI (US); Michael S. Powell, Holt, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 407 days.

(21) Appl. No.: 12/552,323

(22) Filed: Sep. 2, 2009

(65) Prior Publication Data

US 2011/0048836 A1    Mar. 3, 2011

(51) Int. Cl.
*B60K 5/00* (2006.01)
(52) U.S. Cl. .......................... 180/291; 180/300; 180/377
(58) Field of Classification Search .................. 180/291, 180/293, 300, 376, 377; 464/179, 180, 182, 464/183
See application file for complete search history.

(56) References Cited

U.S. PATENT DOCUMENTS

| | | | | |
|---|---|---|---|---|
| 4,471,863 | A * | 9/1984 | Lech, Jr. ................... | 192/213.11 |
| 5,009,301 | A * | 4/1991 | Spitler ........................ | 192/213.3 |
| 7,559,844 | B2 * | 7/2009 | Saeki et al. .................. | 464/68.4 |
| 7,900,963 | B2 * | 3/2011 | Jolley ............................. | 280/781 |
| 2001/0021683 | A1 * | 9/2001 | Takagi et al. ................... | 477/37 |
| 2005/0061573 | A1 * | 3/2005 | Mizuno et al. ................ | 180/376 |

* cited by examiner

*Primary Examiner* — John Walters

(57) ABSTRACT

A powertrain for a motor vehicle includes an engine disposed in a front of the motor vehicle and having an output member, an automatic transmission disposed in a rear of the motor vehicle and having an input member, a torque converter connected to the input member of the automatic transmission, and a shaft disposed along a length of the motor vehicle and connected to the torque converter. A first damper is connected to the output member of the engine and is connected to the shaft. The first damper has a first spring set interconnected to the output member of the engine and a second spring set interconnected to the first spring set and to the shaft. The first damper is operable to isolate torsional vibration between the engine and the shaft and isolate the shaft from torsional resonant behavior.

25 Claims, 1 Drawing Sheet

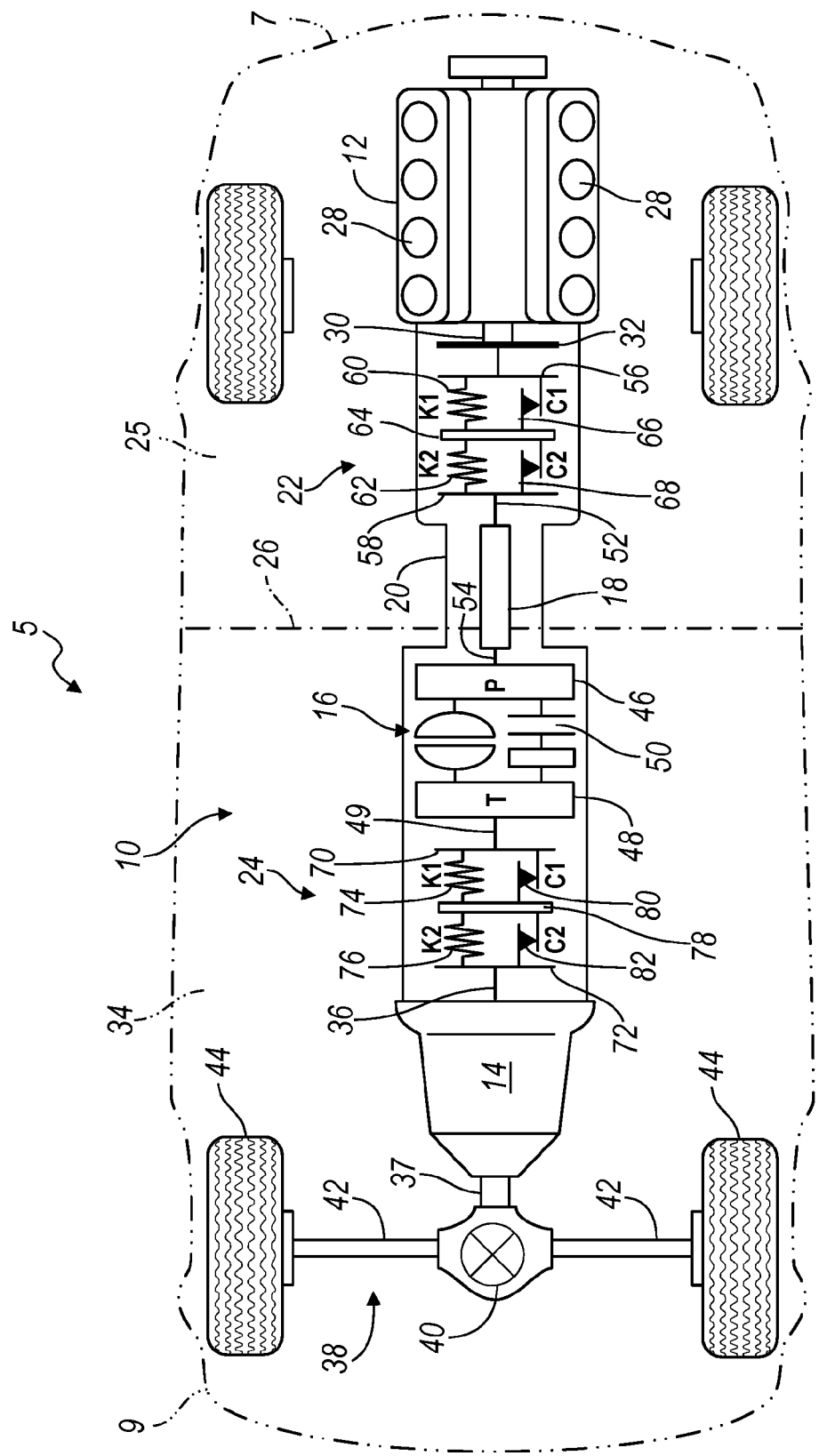

ABSTRACT

POWERTRAIN HAVING MULTI-STAGE DAMPER

FIELD

The present disclosure relates to a powertrain having a multi-stage damper, and more particularly a powertrain having a multi-stage damper connected between a flexplate of an engine and a shaft in order to reduce torsional vibration between the engine and the shaft.

BACKGROUND

The statements in this section merely provide background information related to the present disclosure and may or may not constitute prior art.

Motor vehicle engines produce torsional vibration that is undesirable to transmit through the powertrain and driveline to the motor vehicle. Typically, a damper is used to isolate or reduce the torsional vibration transmitted to the transmission. The damper is placed within a torque converter between a torque converter lock up clutch and the input shaft of the transmission. However, in certain powertrain configurations the damper is insufficient to isolate the torsional vibrations. For example, in powertrains having fuel efficiency systems such as reduced engine cylinder operation with a forward engine connected to a rearward transmission via a propeller shaft, the lock up clutch in the torque converter must be slipped during reduced cylinder operation, as the damper located between the torque converter and the transmission cannot adequately isolate the torsional vibrations in the connecting propeller shaft.

Accordingly, there is room in the art for a powertrain having a multi-stage damper that reduces torsional vibration to allow complete engagement or nearly complete engagement of a torque converter clutch at successively lower engine speeds while the engine operates with a reduced number of active cylinders.

SUMMARY

The present disclosure provides an example of a powertrain for a motor vehicle. The powertrain includes an engine disposed in a front of the motor vehicle and having an output member, an automatic transmission disposed in a rear of the motor vehicle and having an input member, a torque converter connected to the input member of the automatic transmission, and a shaft disposed along a length of the motor vehicle and connected to the torque converter. A first damper is connected to the output member of the engine and is connected to the shaft. The first damper has a first spring set interconnected to the output member of the engine and a second spring set interconnected to the first spring set and interconnected to the shaft. The first damper is operable to isolate torsional vibration between the engine and the shaft.

In one example of the powertrain of the present disclosure, the engine is capable of variable cylinder operation.

In another example of the powertrain of the present disclosure, a second damper is disposed between the torque converter turbine and the transmission and the second damper is operable to attenuate torsional vibration between the torque converter turbine and the transmission.

In yet another example of the powertrain of the present disclosure, the second damper includes a first spring set interconnected to the torque converter turbine and a second spring set interconnected to the first spring set of the second damper and interconnected to the transmission.

In yet another example of the powertrain of the present disclosure, the first spring set of the second damper is in series relationship with the second spring set of the second damper.

In yet another example of the powertrain of the present disclosure, the first spring set of the second damper is in parallel relationship with the second spring set of the second damper.

In yet another example of the powertrain of the present disclosure, the torque converter includes a torque converter lock up clutch.

In yet another example of the powertrain of the present disclosure, a tube is connected between the engine and the transmission, wherein the tube is rotationally fixed relative to the engine and the transmission and is concentric with the propeller shaft.

In yet another example of the powertrain of the present disclosure, the output member of the engine is connected to a flex plate, and the first damper is connected to the flex plate between the engine and the shaft.

In yet another example of the powertrain of the present disclosure, the shaft has a torsional resonance of vibration in the frequency range of engine operation and the first spring set of the first damper is operable to isolate the propeller shaft from engine torque pulsations coincident with torsional resonances of the propeller shaft.

In yet another example of the powertrain of the present disclosure, the first spring set of the first damper is in series relationship with the second spring set of the first damper.

In yet another example of the powertrain of the present disclosure, the first spring set of the first damper is in parallel relationship with the second spring set of the first damper.

In yet another example of the powertrain of the present disclosure, the first damper is a multi-stage torsional vibration damper.

In yet another example of the powertrain of the present disclosure, the shaft crosses a midpoint of the motor vehicle equidistant between the front of the motor vehicle and the rear of the motor vehicle.

Further areas of applicability will become apparent from the description provided herein. It should be understood that the description and specific examples are intended for purposes of illustration only and are not intended to limit the scope of the present disclosure.

DRAWING

The drawing described herein is for illustration purposes only and is not intended to limit the scope of the present disclosure in any way.

FIG. 1 is a schematic view of a motor vehicle according to the principles of the present disclosure.

DETAILED DESCRIPTION

The following description is merely exemplary in nature and is not intended to limit the present disclosure, application, or uses.

With reference to FIG. 1, a motor vehicle is shown and generally indicated by reference number 5. The motor vehicle 5 includes a forward end 7 and a rearward end 9. The motor vehicle 5 includes a powertrain 10 according to the principles of the present disclosure. The powertrain 10 includes an engine 12, a transmission 14, a torque converter 16, a propeller shaft 18, a torque tube 20, a first damper 22, and a second damper 24. The engine 12 is located in a front portion 25 of the motor vehicle 5. The front portion 25 of the motor vehicle 5, for purposes of the present disclosure, is defined as the area of the motor vehicle 5 between the frontward end 7 and a midpoint 26 of the motor vehicle 5 located equidistant from the frontward end 7 and the rearward end 9. The engine 12 is preferably a variable cylinder engine capable of operating with a reduced number of firing cylinders. For example, the engine 12 is depicted in the example provided as having eight cylinders 28. In an improved fuel efficiency mode of operation, only a portion of the eight cylinders 28 are actively fired to provide engine power. This improved fuel efficiency mode of operation improves the fuel economy of the motor vehicle 5. It should be appreciated that the engine 12 may have any number of cylinders 28 without departing from the scope of the present disclosure. The engine 12 includes an output member 30 that connects with a flex plate 32. The flex plate 32 functions to transmit torque produced by the engine 12 and to absorb any thrust or axial loads.

The transmission 14 is a multiple speed automatic transmission that is disposed in a rear portion 34 of the motor vehicle 5. The rear portion 34 of the motor vehicle 5, for purposes of the present disclosure, is defined as the area of the motor vehicle 5 between the rearward end 9 and the midpoint 26. The transmission 14 includes a transmission input member 36 and a transmission output member 37. The transmission input member 36 receives engine torque from the torque converter 16. The transmission 14 is operable to transmit torque received by the transmission input member 36 to the transmission output member 37 in a plurality of forward and reverse speed or gear ratios. The transmission output member 37 is interconnected to a final drive unit 38. The final drive unit 38 generally includes a differential 40, half axles 42, and final drive wheels 44, though various other configurations may be employed without departing from the scope of the present disclosure.

The torque converter 16 generally includes a pump 46, a turbine 48, and a stator (not shown). The pump 46 is connected to and driven by the propeller shaft 18. The turbine 48 is fluidly driven by the rotation of the pump 46. The turbine 48 is coupled to and drives an output shaft 49 that transfers torque through the second damper 24 to the transmission 14. The stator is located between the pump 46 and the turbine 48 and is used to multiply torque within the torque converter 16. The torque converter 16 also includes a lock-up clutch 50 that is operable to selectively mechanically couple the pump 46 to the turbine 48.

The propeller shaft 18 is an elongated member that is interconnected between the engine 12 and the torque converter 16. The propeller shaft 18 is rotatable and communicates the engine torque from the engine 12 to the torque converter 16. Accordingly, the propeller shaft 18 is disposed along a length of the motor vehicle 5 such that the propeller shaft 18 crosses the midpoint 26 of the motor vehicle 5. The propeller shaft 18 includes a first end 52 connected to the first damper 22 and a second end 54 connected to the pump of the torque converter 16. In the example provided, the propeller shaft 18 has a torsional vibration resonance between approximately 30 hertz to approximately 40 hertz, though other torsional vibration resonances may exist during the all modes of operation of the engine 12 without departing from the scope of the present disclosure.

The torque tube 20 is a structural element connected between the engine 12 and the transmission 14. The torque tube 20 is hollow and envelopes the rotatable propeller shaft 18. The torque tube 20 is rotationally fixed relative to the engine 12 and the transmission 16.

The first damper 22 is disposed between the engine 12 and the propeller shaft 18. The first damper 22 is preferably a multi-stage spring damper. The first damper 22 includes a first side cover 56 and second side cover 58. The first side cover 56 is connected to the flex plate 32 of the engine 12. The second side cover 58 is connected to the first end 52 of the propeller shaft 18. The first and second side covers 56, 58 cooperate to define a cavity that encloses a first spring set 60, a second spring set 62, and a floating member 64. The spring sets 60 and 62 may be comprised of any biasing member without departing from the scope of the present disclosure. The first spring set 60 is connected between the first side cover 56 and the floating member 64. The second spring set 62 is connected between the floating member 64 and the second side cover 58. Accordingly, the first spring set 60 is in series relationship with the second spring set 62. The floating member 64 is also preferably coupled to first and second hysteresis elements 66 and 68 operable to dissipate vibration energy in the form of heat through friction. The hysteresis elements 66, 68 may take various forms, such as known elasto-plastic dampers, without departing from the scope of the present disclosure. In addition, it should be appreciated that the first damper 22 may have other configurations, such as having springs in parallel, without departing from the scope of the present disclosure.

The first damper 22 operates by isolating or attenuating torsional vibrations delivered from the flex plate 32 of the engine 12 prior to being transmitted to the propeller shaft 18. Accordingly, the first damper 22 prevents harmonic vibration of the propeller shaft 18 during operation of the motor vehicle 5. Each of the spring sets 60, 62 are tuned to have specific spring travel, stiffness, and associated hysteresis in order to isolate the propeller shaft 18 from the engine 12. Accordingly, the engine 12 may operate in an improved fuel efficiency state while the lockup clutch 50 of the torque converter 16 is fully engaged or engaged with a small amount of controlled slip.

The second damper 24 is disposed between the torque converter 16 and the transmission 14. The second damper 24 is preferably a multi-stage spring damper. The second damper 24 includes a first side cover 70 and second side cover 72. The first side cover 70 is connected to the output shaft 49 of the torque converter 16. The second side cover 72 is connected to the input shaft 36 of the transmission 14. The first and second side covers 70, 72 cooperate to define a cavity that encloses a first spring set 74, a second spring set 76, and a floating member 78. The spring sets 74 and 76 may be comprised of any biasing member without departing from the scope of the present disclosure. The first spring set 74 is connected between the first side cover 70 and the floating member 78. The second spring set 76 is connected between the floating member 78 and the second side cover 72. Accordingly, the first spring set 74 is in series relationship with the second spring set 76. The floating member 78 is also preferably coupled to first and second hysteresis elements 80 and 82 operable to dissipate vibration energy in the form of heat through friction. The hysteresis elements 80, 82 may take various forms, such as known elasto-plastic dampers, without departing from the scope of the present disclosure. In addition, it should be appreciated that the damper may have other configurations, such as having springs in parallel, without departing from the scope of the present disclosure.

The second damper 24 operates by isolating or absorbing torsional vibrations delivered from the pump 46 and/or turbine 48 via the lockup clutch 50 of the torque converter 16 prior to being transmitted to the transmission 14. Accordingly, the second damper 24 prevents harmonic vibration of the input shaft 36 of the transmission 14 and the final drive unit 38 during operation of the motor vehicle 5. Each of the spring sets 74, 76 are tuned to have specific spring travel, stiffness, and associated hysteresis in order to isolate the turbine 48 from the transmission 14. Accordingly, the engine 12 may operate in an improved fuel efficiency state while the lockup clutch 50 of the torque converter 16 is fully engaged or engaged with a small amount of controlled slip.

The powertrain 10 provides improved fuel economy by allowing aggressive engagement, either complete or with low slip, of the lock-up clutch 50 of the torque converter 16 during reduced active cylinder operation of the engine 12, reduces driveline torsional velocities thereby reducing the potential impact on overall perceived noise and vibration of the motor vehicle 5, reduces driveline torsional velocities in full cylinder operation leading to increased opportunity to fully engage the lock up clutch 50 of the torque converter 16, and improves idle quality as driveline components are prevented from entering into a resonance condition.

The description of the invention is merely exemplary in nature and variations that do not depart from the general gist of the invention are intended to be within the scope of the invention. Such variations are not to be regarded as a departure from the spirit and scope of the invention.

What is claimed is:

1. A powertrain for a motor vehicle comprising:
an engine having an output member;
an automatic transmission disposed remotely from the engine, the transmission having an input member in communication with the output member of the engine;
a torque converter having a lockup clutch connected to the input member of the automatic transmission;
an elongated shaft disposed along a length of the motor vehicle and wherein the elongated shaft includes a first end connected to the torque converter and a second end; and
a first damper interconnected to the output member of the engine and interconnected to the second end of the elongated shaft, and
wherein the first damper is operable to isolate torsional vibration between the engine and the elongated shaft.

2. The powertrain of claim 1 wherein the engine is capable of variable cylinder operation.

3. The powertrain of claim 1 further comprising a second damper disposed between the torque converter and the transmission and wherein the second damper is operable to absorb torsional vibration between the torque converter and the transmission.

4. The powertrain of claim 3 wherein the second damper includes a first spring set connected to the torque converter and a second spring set interconnected to the first spring set of the second damper and to the transmission.

5. The powertrain of claim 4 wherein the first spring set of the second damper is in series relationship with the second spring set of the second damper.

6. The powertrain of claim 4 wherein the first spring set of the second damper is in parallel relationship with the second spring set of the second damper.

7. The powertrain of claim 1 further comprising a tube connected between the engine and the transmission, wherein the tube is rotationally fixed relative to the engine and the transmission and is substantially concentric with the elongated shaft.

8. The powertrain of claim 1 wherein the output member of the engine is connected to a flex plate, and the first damper is connected to the flex plate between the engine and the elongated shaft.

9. The powertrain of claim 1 wherein the first damper includes at least one hysteresis element and having a first spring set connected to the output member of the engine and a second spring set interconnected to the first spring set and to the first end of the elongated shaft.

10. The powertrain of claim 9 wherein the elongated shaft has a torsional vibration resonance during all operating modes of the engine, and the first spring set of the first damper is operable to isolate the torsional vibration resonance of the elongated shaft.

11. The powertrain of claim 9 wherein the first spring set of the first damper is in series relationship with the second spring set of the first damper.

12. The powertrain of claim 9 wherein the first spring set of the first damper is in parallel relationship with the second spring set of the first damper.

13. The powertrain of claim 1 wherein the first damper is a multi-stage torsional vibration damper.

14. The powertrain of claim 1 wherein the elongated shaft crosses a midpoint of the motor vehicle equidistant between a front of the motor vehicle and a rear of the motor vehicle.

15. A powertrain for a motor vehicle comprising:
an engine disposed in a front of the motor vehicle and having an output member connected to a flex plate, wherein the engine is capable of variable cylinder operation;
an automatic transmission disposed in a rear of the motor vehicle and having an input member;
a torque converter having a lockup clutch connected to the input member of the automatic transmission;
an elongated shaft disposed along a length of the motor vehicle and connected to the torque converter;
a first damper connected to the flex plate and connected to the elongated shaft, the first damper having a first spring set connected to the flex plate and a second spring set interconnected to the first spring set of the first damper and to the elongated shaft;
a second damper disposed between the torque converter and the transmission, the second damper having a first spring set connected to the torque converter and a second spring set interconnected to the first spring set of the second damper and to the transmission, and
wherein the first damper is operable to isolate torsional vibration between the engine and the elongated shaft and the second damper is operable to absorb torsional vibration between the torque converter and the transmission.

16. The powertrain of claim 15 wherein the first spring set of the second damper is in series relationship with the second spring set of the second damper.

17. The powertrain of claim 15 wherein the first spring set of the second damper is in parallel relationship with the second spring set of the second damper.

18. The powertrain of claim 15 wherein the first damper includes at least one hysteresis element.

19. The powertrain of claim 15 wherein the second damper is connected between a turbine of the torque converter and an input elongated shaft of the transmission.

20. The powertrain of claim 15 wherein the elongated shaft has a torsional vibration resonance during operation of the engine, and the first spring set of the first damper is operable to isolate the torsional vibration resonance of the elongated shaft.

21. The powertrain of claim 15 wherein the first spring set of the first damper is in series relationship with the second spring set of the first damper.

22. The powertrain of claim 15 wherein the first spring set of the first damper is in parallel relationship with the second spring set of the first damper.

23. The powertrain of claim 15 wherein the first damper and the second damper are multi-stage torsional vibration dampers.

24. The powertrain of claim 15 wherein the elongated shaft crosses a midpoint of the motor vehicle equidistant between the front of the motor vehicle and the rear of the motor vehicle.

25. A motor vehicle comprising:
- a front portion;
- a back portion;
- an engine disposed in the front portion and having an output member connected to a flex plate, wherein the engine is capable of variable cylinder operation;
- an automatic transmission disposed in the back portion and having an input member;
- a torque converter connected to the input member of the automatic transmission;
- an elongated shaft disposed along a length of the motor vehicle and connected to the torque converter, the elongated shaft crossing a midpoint of the motor vehicle equidistant between the front portion and the rear portion;
- a first damper connected to the flex plate and connected to the elongated shaft, the first damper having a first spring set connected to the flex plate and a second spring set interconnected to the first spring set of the first damper and interconnected to the elongated shaft;
- a second damper disposed between the torque converter and the transmission, the second damper having a first spring set connected to the torque converter and a second spring set interconnected to the first spring set of the second damper and to the transmission, and
- wherein the first damper is operable to isolate torsional vibration between the engine and the elongated shaft and the second damper is operable to attenuate torsional vibration between the torque converter and the transmission.

* * * * *